US011653684B2

(12) United States Patent
Park et al.

(10) Patent No.: US 11,653,684 B2
(45) Date of Patent: May 23, 2023

(54) SWEETENER COMPOSITION WITH IMPROVED TASTE QUALITY COMPRISING ALLULOSE AND SALT AND METHOD FOR IMPROVING TASTE QUALITY OF ALULOSE USING SALT

(71) Applicant: CJ CHEILJEDANG CORPORATION, Seoul (KR)

(72) Inventors: Jung Gyu Park, Incheon (KR); Su-Jeong Kim, Suwon-si (KR); Youn-Kyung Bak, Suwon-si (KR); Sung Bae Byun, Sejong (KR); Dong Seok Shim, Yongin-si (KR); In Lee, Suwon-si (KR); Seung Won Park, Yongin-si (KR); Dong Chui Jung, Seoul (KR); Jong Min Choi, Suwon-si (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 0 days.

(21) Appl. No.: 16/338,477

(22) PCT Filed: Sep. 19, 2017

(86) PCT No.: PCT/KR2017/010224
§ 371 (c)(1),
(2) Date: Mar. 30, 2019

(87) PCT Pub. No.: WO2018/066835
PCT Pub. Date: Apr. 12, 2018

(65) Prior Publication Data

US 2019/0246673 A1 Aug. 15, 2019

(30) Foreign Application Priority Data

Oct. 7, 2016 (KR) ........................ 10-2016-0130095

(51) Int. Cl.
*A23L 27/30* (2016.01)
*A23L 27/40* (2016.01)
*A23P 20/18* (2016.01)
*A23L 27/00* (2016.01)

(52) U.S. Cl.
CPC ............... *A23L 27/33* (2016.08); *A23L 27/00* (2016.08); *A23L 27/30* (2016.08); *A23L 27/40* (2016.08); *A23L 27/45* (2016.08); *A23P 20/18* (2016.08); *A23V 2002/00* (2013.01); *A23V 2200/132* (2013.01); *A23V 2200/16* (2013.01); *A23V 2250/24* (2013.01)

(58) Field of Classification Search
CPC .......... A23L 27/33; A23L 27/00; A23L 27/30; A23V 2200/132; A23V 2250/24
USPC ........................................................ 426/103
See application file for complete search history.

(56) References Cited

U.S. PATENT DOCUMENTS 4,556,566 A 12/1985 Bell
5,094,862 A 3/1992 Bunick
8,748,589 B2 6/2014 Izumori
9,049,876 B2 6/2015 Fujihara et al.
9,215,887 B2 12/2015 Yoshida
10,039,834 B2 8/2018 Prakash et al.
2009/0068710 A1 3/2009 Izumori et al.
2009/0304891 A1 12/2009 Fujihara
2011/0045137 A1 2/2011 Yoshida
2011/0236551 A1* 9/2011 Hammond ............ C13B 30/021 426/549
2012/0070534 A1 3/2012 Suzuki
2012/0076908 A1 3/2012 Fujihara et al.
2012/0094940 A1 4/2012 Takamine et al.
2013/0309388 A1 11/2013 Yano et al.
2014/0271996 A1 9/2014 Prakash et al.
2014/0272068 A1 9/2014 Prakash et al.
2014/0322389 A1 10/2014 Prakash et al.
2014/0342052 A1* 11/2014 Nehmer ................. A23L 27/36 426/96
2014/0342074 A1 11/2014 Young
2015/0018432 A1 1/2015 Prakash et al.
2015/0359251 A1 12/2015 Jackson et al.
2016/0029675 A1 2/2016 Hattori et al.
2016/0198751 A1 7/2016 Fletcher
2016/0213036 A1 7/2016 Shen et al.
2016/0302463 A1 10/2016 Woodyer
2016/0324201 A1 11/2016 Young
2017/0079313 A1 3/2017 Woodyer et al.
2017/0295827 A1 10/2017 Prakash et al.
2018/0049458 A1 2/2018 Woodyer et al.
2018/0206529 A1 7/2018 Oertling
2018/0243325 A1 8/2018 Choi et al.

(Continued)

FOREIGN PATENT DOCUMENTS

CA 2918060 1/2015
CL 2016002955 A1 5/2017

(Continued)

OTHER PUBLICATIONS

Allulose, the strange alternative sweetener, not in English—considered as disclosed (http://pnu2010.blog.me/220802621189), Sep. 2, 2016.
T. Matsuo and K. Izumori, “D-Psicose, a rare sugar that provides no energy and additionally beneficial effects for clinical nutrition”, Asia Pacific Journal of Clinical Nutrition, 13, S127 (2004).
T. Matsuo et al., “Dietary D-psicose, a C-3 epimer of D-fructose, suppresses the activity of hepatic lipogenic enzymes in rats”, Asia Pacific Journal of Clinical Nutrition, 10, 233-237 (2001).
Database Gnpd [Online] MINTEL; Aug. 22, 2016, anonymous: “Allulose Sugar Blend”, XP055686791, www.gnpd.com, Database accession No. 4228821 pp. 1-2.

(Continued)

*Primary Examiner* — Jyoti Chawla
(74) *Attorney, Agent, or Firm* — Renner, Otto, Boisselle & Sklar, LLP

(57) ABSTRACT

A sweetener composition including allulose and a salt and having improved taste, and a method of improving taste of allulose are disclosed.

6 Claims, 1 Drawing Sheet

(56) References Cited

U.S. PATENT DOCUMENTS

| | | | |
|---|---|---|---|
| 2018/0296678 | A1 | 10/2018 | Prakash et al. |
| 2019/0029299 | A1 | 1/2019 | Bak et al. |
| 2019/0037901 | A1 | 2/2019 | Jackson et al. |
| 2019/0218488 | A1 | 7/2019 | Choi et al. |
| 2019/0230956 | A1 | 8/2019 | Prakash et al. |
| 2019/0239539 | A1 | 8/2019 | Shim et al. |
| 2019/0297934 | A1 | 10/2019 | Jackson et al. |
| 2019/0350242 | A1 | 11/2019 | Jackson et al. |
| 2020/0029612 | A1 | 1/2020 | Jackson et al. |

FOREIGN PATENT DOCUMENTS

| | | | | | |
|---|---|---|---|---|---|
| CL | 2018000523 | A1 | | 2/2019 | |
| CL | 2019000851 | A1 | | 6/2019 | |
| CL | 2019000875 | A1 | | 6/2019 | |
| CN | 105101815 | | | 11/2015 | |
| CN | 105611846 | | | 5/2016 | |
| CN | 108697140 | | | 10/2018 | |
| CO | 16163394 | | | 4/2016 | |
| EP | 2 090 180 | A1 | | 8/2009 | |
| EP | 3 427 601 | A1 | | 1/2019 | |
| GB | 2526383 | A | * | 11/2015 | ............ A23L 27/30 |
| GB | 2536304 | A | | 9/2016 | |
| JP | 2010-200719 | A | | 4/2013 | |
| JP | 2014-014276 | A | | 1/2014 | |
| JP | 2014-113059 | A | | 6/2014 | |
| JP | 2014-140347 | A | | 8/2014 | |
| KR | 2003-0093360 | A | | 12/2003 | |
| KR | 2009-0077072 | A | | 7/2009 | |
| KR | 2011-0016906 | A | | 2/2011 | |
| KR | 2013-0029754 | A | | 3/2013 | |
| KR | 2015-0127155 | A | | 11/2015 | |
| KR | 2015-0139607 | A | | 12/2015 | |
| KR | 2016-0075467 | A | | 6/2016 | |
| WO | 2011/048616 | A2 | | 4/2011 | |
| WO | 2014/168015 | A1 | | 10/2014 | |
| WO | WO 2015-015209 | A1 | | 2/2015 | |
| WO | WO-2015028784 | A1 | * | 3/2015 | .............. A23L 2/56 |
| WO | WO 2015-075473 | A1 | | 5/2015 | |
| WO | 2015177522 | | | 11/2015 | |
| WO | 2015/195713 | A1 | | 12/2015 | |
| WO | 2016/135458 | A1 | | 9/2016 | |
| WO | WO 2017-016907 | A1 | | 2/2017 | |

OTHER PUBLICATIONS

Database GNPD [Online] MINTEL; May 3, 2016, anonymous: “Allulose”, XP055686788, www.gnpd.com, Database accession No. 3968713 pp. 1-2.

Extended European Search Report for corresponding European Patent Application No. 17858630.1 dated May 12, 2020 pp. 1-9.

Examination Report issued by Canadian Patent Office for corresponding Canadian Patent Application No. 3,039,499 dated Sep. 28, 2020.

Office Action dated Apr. 23, 2021 for the corresponding Canadian Application No. 3,039,499.

* cited by examiner

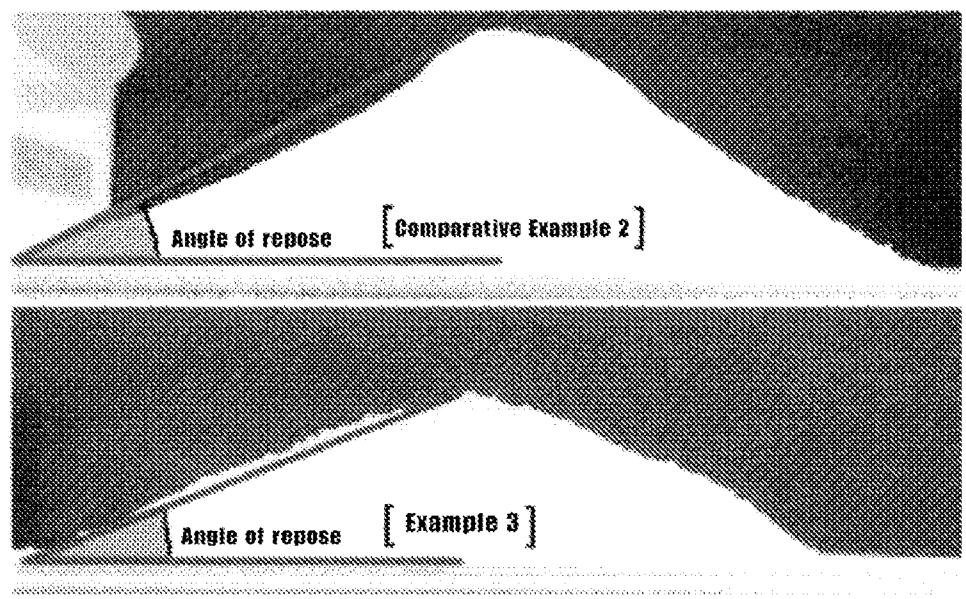
Angle of repose
[Comparative Example 2]
Angle of repose
[Example 3]

SWEETENER COMPOSITION WITH IMPROVED TASTE QUALITY COMPRISING ALLULOSE AND SALT AND METHOD FOR IMPROVING TASTE QUALITY OF ALULOSE USING SALT

FIELD OF THE INVENTION

The present invention relates to a sweetener composition having improved taste comprising allulose and a method of improving taste of allulose.

DESCRIPTION OF RELATED ART

Allulose is a natural sugar that is present in a trace amount during isomerization of molasses or glucose and is a monosaccharide having a sweetness 70% that of sugar. Unlike fructose or sugar, allulose is not metabolized in the human body and has an insignificant caloric value. In addition, allulose has been reported to inhibit formation of body fat (Matuo, T. et. al., Asia Pac. J. Clin. Nutr., 10, 233-237, 2001; Matsuo, T. and K. Izumori, Asia Pac. J. Clin. Nutr., 13, S127, 2004). Further, it is known that allulose has no effect on blood sugar and has non-cariogenic and anti-cariogenic properties.

However, allulose is not a desirable substitute for sugar and other sweeteners due to inherent off-taste (acridity and bitterness) thereof and is only used as an auxiliary sweetener. In addition, allulose has low processing efficiency and thus poor industrial applicability due to disadvantageous physical properties thereof (small average grain size, uneven crystal size, low bulk density and low fluidity).

The present inventors have made extensive efforts to improve taste and physical properties of allulose. As a result, the present inventors found that, when allulose is coated with a salt, the off-taste/off-flavor, bitterness and acridity of the allulose can be relieved while improving the physical properties and processing efficiency thereof.

DISCLOSURE

Technical Problem

It is one aspect of the present invention to provide a sweetener composition comprising allulose and a salt.

It is another aspect of the present invention to provide a method of improving taste of allulose, which comprises coating allulose with a salt.

It is another aspect of the present invention to provide a method of preparing a sweetener composition comprising allulose coated with a salt, wherein the method comprises coating allulose with the salt.

It is another aspect of the present invention to provide a method of improving flowability of allulose, which the method comprises coating allulose with a salt.

Technical Solution

In accordance with one aspect of the present invention, a sweetener composition comprises allulose and a salt.

Herein, "allulose" refers to an epimer of fructose, which is a kind of ketohexose, a monosaccharide (C6). Allulose may be extracted from natural object or be produced chemically or biologically using enzyme, without being limited thereto.

Specifically, allulose may be crystalline allulose, and more specifically crystalline allulose may be in a form coated with the salt.

Herein, the term "coating" or "coated" refers to a covering attached and/or surrounded to a surface of any material, or to make the covering.

In one embodiment, the salt may be present in an amount of 0.005 parts by weight to 5 part by weight, 0.005 parts by weight to 3 parts by weight, 0.005 parts by weight to 2 parts by weight, 0.005 parts by weight to 1.5 parts by weight, 0.005 parts by weight to 1 parts by weight, 0.01 parts by weight to 5 parts by weight, 0.01 parts by weight to 3 parts by weight, 0.01 parts by weight to 2 parts by weight, 0.01 parts by weight to 1.5 parts by weight, 0.01 parts by weight to 1 parts by weight, 0.05 parts by weight to 5 parts by weight, 0.05 parts by weight to 3 parts by weight, 0.05 parts by weight to 2 parts by weight, 0.05 parts by weight to 1.5 parts by weight, 0.05 parts by weight to 1 parts by weight, 0.1 parts by weight to 5 parts by weight, 0.1 parts by weight to 3 parts by weight, 0.1 parts by weight to 2 parts by weight, 0.1 parts by weight to 1.5 parts by weight, 0.1 parts by weight to 1 parts by weight, 0.5 parts by weight to 5 parts by weight, 0.5 parts by weight to 3 parts by weight, 0.5 parts by weight to 2 parts by weight, 0.5 parts by weight to 1.5 parts by weight, 0.5 parts by weight to 1 parts by weight, or 0.8 parts by weight to 1.2 parts by weight, relative to 100 parts by weight of the allulose.

Specifically, the salt may be one or more selected from the group consisting of sodium chloride, potassium chloride, magnesium chloride, calcium chloride, sodium glutamate, and sodium succinate. More specifically, the salt may be sodium chloride, and examples of the sodium chloride may include bay salts, reproduced salts, burnt salts, molten salts, refined salts, processed salts, and other salts.

In one embodiment, the sweetener composition has a M.A. (mean aperture) of 350 μm or more. Specifically, the sweetener composition has a M.A. of 360 μm or more, 365 μm or more, 370 μm or more, 375 μm or more, 350 μm to 400 μm, 360 μm to 400 μm, 365 μm to 400 μm, 370 μm to 400 μm, 375 μm to 400 μm, 350 μm to 390 μm, 360 μm to 390 μm, 365 μm to 390 μm, 370 μm to 390 μm, 375 μm to 390 μm, 350 μm to 380 μm, 360 μm to 380 μm, 365 μm to 380 μm, 370 μm to 380 μm, or 375 μm to 380 μm.

In one embodiment, the sweetener composition has a coefficient of variation in size distribution of 32% or less, 31% or less, 30% or less, 29% or less, 28% or less, 25% to 32%, 25% to 31%, 25% to 30%, 25% to 29%, 25% to 28%, 27% to 32%, 27% to 31%, 27% to 30%, 27% to 29%, or 27% to 28%.

In one embodiment, the sweetener composition has a bulk density of 69 g/100 ml or more. Specifically, the sweetener composition has a bulk density of 69 g/100 ml to 100 g/100 ml, 69 g/100 ml to 85 g/100 ml, 69 g/100 ml to 75 g/100 ml, 69 g/100 ml to 74 g/100 ml, 70 g/100 ml to 100 g/100 ml, 70 g/100 ml to 85 g/100 ml, 70 g/100 ml to 75 g/100 ml, 70 g/100 ml to 74 g/100 ml, 71 g/100 ml to 100 g/100 ml, 71 g/100 ml to 85 g/100 ml, 71 g/100 ml to 75 g/100 ml, 71 g/100 ml to 74 g/100 ml, 73 g/100 ml to 100 g/100 ml, 73 g/100 ml to 85 g/100 ml, 73 g/100 ml to 75 g/100 ml, or 73 g/100 ml to 74 g/100 ml.

In one embodiment, the sweetener composition has an angle of repose of 30° or less. Specifically, the sweetener composition has an angle of repose of 29° or less, 28° or less, 27° or less, 26° or less, 20° to 30°, 20° to 29°, 20° to 28°, 20° to 27°, 20° to 26°, 22° to 30°, 22° to 29°, 22° to 28°, 22° to 27°, 22° to 26°, 24° to 30°, 24° to 29°, 24° to 28°, 24° to 27°, or 24° to 26°.

In one embodiment, the sweetener composition has improved taste. Specifically, the improvement in taste may mean reduction in bitterness, acridity, off-taste, off-flavor, or a combination thereof.

In one embodiment, the sweetener composition may be a form of powder.

In one embodiment, the sweetener composition may further include any suitable sweetener other than allulose. Examples of the sweetener other than allulose may include rebaudioside A, fructose, glucose, maltose, lactose, and inverted sugar, without being limited thereto. Alternatively, the sweetener composition may not include any sweetener other than allulose.

In one embodiment, the sweetener composition may be used to provide sweetness to food. For example, the sweetener composition may be used as a sweetener for homemade foods and/or processed foods. Examples of the processed foods may include confectionery, baking products, cereals, desserts, jams, beverages, chocolates, chewing gums, gumdrops, and ice creams. In addition, the sweetener composition may also be used in medicines.

In one embodiment, the sweetener composition may further include flavouring agent, preservatives, stabilizers, antioxidants, or nutritional ingredients such as vitamins, proteins, salts, electrolytes, minerals, and amino acids.

Another aspect of the present invention provides a method of improving taste of allulose, which comprises coating allulose with a salt.

In one embodiment, the allulose may be coated with the salt by means of spray.

Herein, the term "spray" or "spraying" means to spout or spray any liquid material forward a subject. Specifically, the spraying may be performed under the condition of gravity-free. The spray may be sequentially performed or partitively performed two times or more. That is, the spray may be performed 1 time to 10 times, 1 time to 5 times, 1 time to 4 times, 2 times to 10 times, 2 times to 5 times, or 2 times to 4 times. Furthermore, the spray may be performed for 1 second to 10 seconds, 1 second to 5 seconds, 1 second to 4 seconds, 2 seconds to 10 seconds, 2 seconds to 5 seconds, or 2 seconds to 4 seconds. More specifically, in case the spray is performed two times or more, each spraying is performed at interval of 1 second to 60 seconds, 10 seconds to 60 seconds, 20 seconds to 60 seconds, 1 second to 50 seconds, 10 seconds to 50 seconds, 20 seconds to 50 seconds, 1 second to 40 seconds, 10 seconds to 40 seconds, or 20 seconds to 40 seconds.

In one embodiment, the salt may be a salt solution in which the salt is dissolved in solvent. Specifically, the solvent may be water or ethanol.

In one embodiment, the method of improving taste of allulose may further comprise drying the coated allulose or composition after the coating.

Specifically, the dry may be performed at a temperature of 60° C. to 100° C., 70° C. to 100° C., 80° C. to 100° C., or 80° C. to 90° C. The air may be blown for the dry, and more specifically the air of said temperature may be blown for the dry. Furthermore, the dry may be performed for 1 minute to 60 minutes, 1 minute to 30 minutes, 1 minute to 10 minutes, 3 minutes to 60 minutes, 3 minutes to 30 minutes, or 3 minutes to 10 minutes. After the dry, the allulose or the composition has water content of 5% or less, 3% or less, 1% or less, 0.1% to 5%, 0.1% to 3%, or 0.1% to 1%, without not limited thereto.

In one embodiment, the method of improving taste of allulose may further comprise cooling the dried allulose or composition, after drying. The cooling may be performed at a temperature of 1° C. to 40° C., 5° C. to 40° C., 10° C. to 40° C., 15° C. to 40° C., 20° C. to 40° C., 1° C. to 30° C., 5° C. to 30° C., 10° C. to 30° C., 15° C. to 30° C., or 20° C. to 30° C. The air may be blown for the cooling, and more specifically the air of the temperature may be blown for the cooling. Furthermore, the cooling may be performed for 1 minute to 60 minutes, 1 minute to 30 minutes, 1 minute to 10 minutes, 1 minute to 5 minutes, 2 minutes to 60 minutes, 2 minutes to 30 minutes, 2 minutes to 10 minutes, 2 minutes to 5 minutes, or 2 minutes to 4 minutes.

Since the allulose, the salt, the coating, and improvement in taste are the same as those in the aforementioned aspect, description thereof will be omitted.

In accordance with a further aspect of the present invention, it is provided a method of preparing a sweetener composition comprising salt-coated allulose, comprising coating the allulose with the salt.

In one embodiment, the method of preparing the sweetener composition may further comprise drying the salt-coated allulose after the coating. In other embodiment, the method of preparing the sweetener composition may further comprise cooling the dried allulose or composition, after the drying.

In the aspect, since the allulose, the salt, the coating, the drying and cooling are the same as those in the aforementioned aspect, description thereof will be omitted.

In accordance with a further aspect of the present invention, it is provided a method of improving flowability of allulose, comprising coating the allulose with salt.

In one embodiment, the method of improving flowability of allulose may further comprise drying the salt-coated allulose after the coating. In other embodiment, the method of improving flowability of allulose may further comprise cooling the dried allulose or composition, after the drying.

In the aspect, since the allulose, the salt, the coating, the drying and cooling are the same as those in the aforementioned aspect, description thereof will be omitted.

Effect of the Invention

The sweetener composition has improvement in taste comprising reduction in bitterness, acridity, off-taste, off-flavor, or a combination thereof, and thus has high preference. Furthermore, the composition has the improved properties in view of M.A., homogeneity of particle size, and flowability compared to the conventional allulose, thereby having good packaging and easy processibility.

BRIEF DESCRIPTION OF DRAWINGS

FIG. 1 is an image of results of measurement of angle of repose, which is an index for evaluating flowability of allulose powder samples of Comparative Example 2 and Example 3.

DETAILED DESCRIPTION OF THE INVENTION

Hereinafter, the present invention will be described in more detail with reference to examples. However, it should be understood that these examples are provided for illustration only and are not to be construed in any way as limiting the present invention.

EXAMPLE

Preparative Example 1

Preparation of Salt-Coated Allulose Particles 1-1. Preparation of Sample

Commercially available allulose crystals (C J Cheiljedang, purity: 99% or higher) were provided. In addition, based on the weight of the allulose crystals, 0.01 wt %, 0.1 wt %, or 1 wt % of sodium chloride (Hanjusalt, purity: 95% or more) was dissolved in water, thereby preparing an aqueous sodium chloride solution.

1-2. Mixing and Spray Coating

The allulose crystals were placed in a horizontal mixer (F20, Sejitech) and stirred at 40 rpm. After stirring for 1 minute, the aqueous sodium chloride solution was primarily sprayed onto the allulose crystals for 1 second through a nozzle (SU6023 spray system) of the mixer, followed by spraying the solution three times at intervals of 30 seconds to coat the allulose crystals with sodium chloride.

Then, the sodium chloride-coated allulose crystals were dried by applying drying air (at 85±5° C.) to the allulose crystals for 5 minutes, followed by application of cold air (at 25±5° C.) for 3 minutes, thereby preparing salt-coated allulose particles of Examples 1 to 3(table 1).

Comparative Example 1

Allulose Crystals not Coated with Salt

Commercially available allulose crystals (CJ Cheiljedang, purity: 99% or higher) were used.

Comparative Example 2

Preparation of Allulose-Salt Mixture

Commercially available allulose crystals (CJ Cheiljedang, purity: 99% or higher) and 1 wt % of sodium chloride (Hanjusalt, purity: 95% or more) based on the weight of the allulose crystals were placed in a horizontal mixer, and stirred at 40 rpm for 10 minutes, thereby preparing an allulose-salt mixture of Comparative Example 2(table 1).

TABLE 1

| Item | Example 1 | Example 2 | Example 3 | Comparative Example 1 | Comparative Example 2 |
|---|---|---|---|---|---|
| Preparation method | Spray coating | Spray coating | Spray coating | — | Simple mixing |
| Allulose crystal (wt % in dry solid content) | 99.99 | 99.9 | 99 | 100 | 99 |
| Sodium chloride (wt % in dry solid content | 0.01 | 0.1 | 1 | — | 1 |

Experimental Example 1

Sensory Evaluation

Each of the allulose-containing compositions of Examples 1 to 3 and Comparative Example 1 was diluted to 15 Brix using Equation 1:

Weight of sample (15 g)+Weight of purified water (85 g)=15 Brix of diluted sample [Equation 1]

Sensory evaluation was performed on each of the samples of Examples 1 to 3 and Comparative Example 1, having been diluted to 15 Brix, by examining off-taste/off-flavor intensity, bitterness intensity, acridity intensity, and overall preference of the sample in 15 trained panel members, followed by evaluation on a 5-point scale. A higher value indicates higher intensity or preference.

Statistical analysis was performed using SAS 9.1 (SAS Inc., Cary, N.C., USA), significant difference analysis was performed by one-way ANOVA, and a post-test was performed by Duncan's multiple range test. All analyses were performed at a significance level of $p<0.05$.

As a result, it was confirmed that the samples of Examples 1 to 3 were relieved in terms of off-taste/off-flavor intensity, bitterness intensity, and acridity intensity at a significance level of $p<0.05$, as compared with the sample of Comparative Example 1, as shown in Table 2. Therefore, it can be seen that allulose coated with sodium chloride can have improved sensory properties.

TABLE 2

| Item | Example 1 | Example 2 | Example 3 | Comparative Example 1 | P |
|---|---|---|---|---|---|
| Off-taste/off-flavor intensity | 2.9 | 2.8 | 2.6 | 3.8 | 0.01 |
| Bitterness intensity | 2.8 | 2.8 | 2.5 | 3.4 | 0.01 |
| Acridity intensity | 2.7 | 2.7 | 2.8 | 3.5 | 0.04 |
| Overall preference | 3.5 | 3.5 | 3.1 | 2.7 | 0.00 |

Experimental Example 2

Mixing Uniformity of Salt-Coated Allulose Particles

Mixing uniformity of each of the sample of Example 3 and the sample of Comparative Example 2, prepared by simply mixing allulose crystals with sodium chloride in the same weight ratio as in Example 3, was verified by HPLC. Details of the verification method are as follows:

1) Instrument

High performance liquid chromatograph (HPLC): Alliance, Waters, e2695 Separation Modules, USA; Waters column Heater Module; RI detector Water 2414; Empower™ Software 2) Reagent Standard allulose: Sigma P8043 (CAS No. 551-68-8)

Distilled water: distilled water for HPLC

3) Preparation of Standard Solution 100 mg of the standard allulose was placed in a 10 ml volumetric flask and then made to 10 ml using distilled water (to a concentration of 10,000 mg/L), followed by dilution to a concentration of 625, 1250, 2500, 5000, or 10,000 mg/L, thereby preparing a standard solution.

4) Preparation of Test Solution

About 0.5 g of each of the samples of Comparative Examples 1 to 2 and Examples 1 to 3 was collected and made to 100 ml using distilled water, followed by filtration through a 0.45 μm filter, thereby preparing a test solution (concentration: about 5,000 mg/L). In order to check mixing uniformity of salt in the test solution, 5 specimens were taken from randomly selected different portions of the test solution. Amount of salt and difference in salt amount were analyzed as follows:

5) Test Setup

High performance liquid chromatography conditions

A. Column: 7.8 mm×300 mm Aminex HPX87C (Bio Rad) or an exclusion type ion exchange system corresponding thereto.

B. Column temperature: 80° C.

C. Mobile phase: distilled water

D. Flow rate: 0.6 ml/min

E. Detector: Differential refractometer (RID)

Preparation of calibration curve: 20 μl of the standard solution at each concentration was introduced into an HPLC and then analyzed, followed by preparation of a calibration curve, the horizontal and vertical axes of which indicate the amount of allulose (unit: mg) and the area of a chromatogram, respectively.

Calculation: Area of allulose was read, followed by determination as to the content of allulose based on the calibration curve.

6) Calculation Method

Allulose content (g/100 g of sample)={(Concentration found from calibration curve (g/L)×diluted volume (mL))/(Weight of collected sample (g)×1000)}×100

As a result, it was confirmed that, in Example 3, the allulose content (99.2 g/100 g) was decreased by addition of sodium chloride, whereas, in Comparative Example 3, the allulose content was as high as about 100.0 g/100 g despite addition of sodium chloride, that is, the allulose was not uniformly mixed with the sodium chloride (Table 3). Therefore, it can be seen that, when allulose crystals are coated with sodium chloride by spraying an aqueous sodium chloride solution onto the allulose crystals, uniformity in mixing of sodium chloride with allulose can be improved, as compared with when allulose crystals are simply mixed with sodium chloride. In addition, in the sample of Example 3, which was prepared by spray coating, a standard deviation between values obtained from the 5 randomly collected specimens was 0.056, much lower than the standard deviation (0.142) in the sample of Comparative Example 2, which was prepared by simple mixing. Therefore, it can be seen that, when allulose particles are prepared by salt coating, uniformity in dispersion of the salt coupled to allulose can be considerably improved.

TABLE 3

| Item | Specimen 1 | Specimen 2 | Specimen 3 | Specimen 4 | Specimen 5 | Average | Standard deviation | p-value |
|---|---|---|---|---|---|---|---|---|
| Comparative Example 2 | 100.2 | 99.8 | 99.9 | 99.9 | 100.1 | 100.0 | 0.142 | 0.000 |
| Example 3 | 99.2 | 99.1 | 99.2 | 99.3 | 99.3 | 99.2 | 0.056 | |

Experimental Example 3

Physical Properties (Size, Bulk Density, and Flowability) of Salt-Coated Allulose Particles Allulose crystals have a small mean aperture (M.A) and non-uniform rod-like particle shape and thus have a high coefficient of variation (Co.V) in size distribution. As a result, a large amount of fine powder can be generated during packing, causing deformation or breaking of a seal. In addition, since allulose crystals have low bulk density (B.D) and low flowability, allulose powder also has low fluidity, causing line clogging during production or making fixed-quantity packaging difficult. Thus, it was verified whether the aforementioned physical properties (mean aperture, coefficient of variation, bulk density, and flowability) could be improved by salt coating.

3-1. Measurement of Particle Size

Mean aperture (M.A.) of each of the prepared samples (Comparative Examples 1 to 2 and Examples 1 to 3) was measured using a sieve shaker (Octagon D200, Endecotts, England) in the following manner: After weighing 100 g of each of the samples using a precision scale (ML 4002T, Mettler Toledo, Switzerland), sieves having different mesh sizes (30 μm, 35 μm, 40 μm, 50 μm, 60 μm, 70 μm, 80 μm, 100 μm, 120 μm, and 140 μm) were stacked one above another, followed by mounting the sieve stack on the sieve shaker. One or two rubber stoppers were inserted into each of the sieves to prevent clogging of sieve holes. 100 g of each of the weighed samples was poured into an uppermost sieve, followed by shaking for 5 minutes. After a sample residue was brushed from the uppermost sieve, the weight of the sample remaining on each sieve was measured using a precision scale. After, for each mesh size, the cumulative amount of the remaining sample was recorded and then marked on normal probability paper, a straight line graph was created by connecting normal probability values corresponding to the marked cumulative amounts, followed by calculation of mean aperture according to Equation 2:

Mean Aperture (M.A)=Mesh size (μm) of a sieve at a point of intersection of the 50% line of the normal probability paper and the straight line of graph [Equation 2]

3-2. Measurement of Bulk Density

Bulk density of each of the prepared samples was measured in accordance with international standards, DIN ISO 697 and EN ISO 60. Specifically, an empty receiving cup was weighed and then placed under a funnel, which was placed 10 cm above the ground. After the funnel was centered and secured using a level gauge, a bottom of the funnel was closed to prevent an introduced sample from leaking down. After a sufficient amount of each of the samples of Examples 3 and Comparative Examples 1 to 2 was introduced into the funnel, the bottom of the funnel was opened to allow the sample to fall freely into the receiving cup. After each of the samples was poured until the receiving cup overflowed, the bottom of the funnel was closed again and the overflow of the sample was removed such that the volume of the remaining sample could be exactly the same as that of the receiving cup. After the weight of the receiving cup filled with the sample was measured, the bulk density of the sample was calculated according to Equation 3:

Bulk density (g/100 mL)={(Weight of the sample contained in the receiving cup (g))/(Volume of the receiving cup) (mL)}×100 [Equation 3]

3-3. Measurement of Flowability

Flowability of each of the prepared samples (Comparative Examples 1 to 2 and Examples 1 to 3) was measured by the Angle of Repose Method specified in US Pharmacopoeia Chapter 1174 and European Pharmacopoeia Chapter 2.9.76. Specifically, after a funnel placed 10 cm above the ground was centered and secured using a level gauge, a bottom of the funnel was closed to prevent an introduced sample from leaking down. After 100 g of each of the samples of Examples 1 to 3 and Comparative Examples 1 to 2 was introduced into the funnel, the bottom of the funnel was opened to allow the sample to fall freely and pile up on a disk (13 cm in diameter) on the ground. Then, the angle of repose of the piled sample was measured to determine flowability.

3-4. Property Evaluation

It was confirmed that the salt-coated allulose powder samples of Examples 1 to 3 had increased mean aperture and low coefficient of variation in size distribution (that is, high uniformity in crystal size), as compared with the allulose powder samples of Comparative Examples 1 to 2. In addition, it was confirmed that the salt-coated allulose powder samples of Examples 1 to 3 had increased bulk density and flowability (small angle of repose, see FIG. 1) (Table 4). Particularly, it was confirmed that, for a given amount of salt, the salt-coated allulose powder sample of Example 3, prepared by salt spray coating had considerably reduced coefficient of variation in size distribution, as compared with the allulose powder sample of Comparative Example 2, prepared by simple mixing.

Therefore, it can be seen that the salt-coated allulose powder according to the present invention has improved packaging performance and processability, as compared with typical allulose powder products, and thus is industrially useful.

TABLE 4

| Sample | M.A μm | Co.V % | B.D g/100 mL | Flowability (Angle of repose °) |
|---|---|---|---|---|
| Comparative Example 1 | 331 | 34.7 | 67.3 | 31.3 |
| Comparative Example 2 | 339 | 38.0 | 68.3 | 30.5 |
| Example 1 | 360 | 30.6 | 69.9 | 27.8 |
| Example 2 | 369 | 28.1 | 71.8 | 25.5 |
| Example 3 | 378 | 27.3 | 73.3 | 25.0 |

Although some embodiments have been described herein, it should be understood by those skilled in the art that these embodiments are given by way of illustration only and the present invention is not limited thereto. In addition, it should be understood that various modifications, variations, and alterations can be made by those skilled in the art without departing from the spirit and scope of the present invention. Therefore, the scope of the invention should be limited only by the accompanying claims and equivalents thereof.

What is claimed is:

1. A sweetener composition comprising allulose and a salt, wherein the allulose is a crystalline allulose and the surface of the crystalline allulose is coated with the salt, the salt is sodium chloride, potassium chloride, magnesium chloride, calcium chloride, sodium glutamate, sodium succinate, or combinations thereof, the salt is present in an amount of 0.1 parts by weight to 1 part by weight relative to 100 parts by weight of the allulose, and the coating of the salt is formed by spraying a salt-containing solution onto the surface of the crystalline allulose, wherein the salt-containing solution consists of the salt(s) and water.

2. The sweetener composition according to claim 1, wherein the salt is sodium chloride.

3. The sweetener composition according to claim 1, wherein the sweetener composition has a mean aperture of 350 μm or more.

4. The sweetener composition according to claim 1, wherein the sweetener composition has a coefficient of variation in size distribution of 32% or less.

5. The sweetener composition according to claim 1, wherein the sweetener composition has a bulk density of 69 g/100 ml or more.

6. The sweetener composition according to claim 1, wherein the sweetener composition has an angle of repose of 30° or less.

* * * * *